US011255828B2

(12) United States Patent
McCauley

(10) Patent No.: US 11,255,828 B2
(45) Date of Patent: Feb. 22, 2022

(54) CARRIER GAS REDUCTION FOR GAS CHROMATOGRAPHY

(71) Applicant: Thermo Finnigan LLC, San Jose, CA (US)

(72) Inventor: Edward B. McCauley, Cedar Park, TX (US)

(73) Assignee: THERMO FINNIGAN LLC, San Jose, CA (US)

( * ) Notice: Subject to any disclaimer, the term of this patent is extended or adjusted under 35 U.S.C. 154(b) by 168 days.

(21) Appl. No.: 16/839,016

(22) Filed: Apr. 2, 2020

(65) Prior Publication Data

US 2021/0310998 A1 Oct. 7, 2021

(51) Int. Cl.
*G01N 30/16* (2006.01)
*G01N 30/32* (2006.01)
*G01N 30/72* (2006.01)

(52) U.S. Cl.
CPC ............ *G01N 30/32* (2013.01); *G01N 30/16* (2013.01); *G01N 30/7206* (2013.01); *G01N 2030/324* (2013.01)

(58) Field of Classification Search
CPC .... G01N 30/32; G01N 30/16; G01N 30/7206; G01N 2030/324; G01N 30/18; G01N 2030/025; G01N 2030/167; G01N 30/7213; G01N 2030/126; G01N 2030/127
USPC .......... 73/23.4, 863, 864.21, 864.74, 864.81; 422/89, 527
See application file for complete search history.

(56) References Cited

U.S. PATENT DOCUMENTS

| | | | |
|---|---|---|---|
| 5,954,862 A | 9/1999 | Wilson | |
| 8,371,152 B2 | 2/2013 | McCauley et al. | |
| 9,435,774 B2 | 9/2016 | Kawana | |
| 9,632,064 B2 | 4/2017 | McCauley et al. | |
| 9,874,546 B2 | 1/2018 | McCauley | |
| 10,126,276 B2 | 11/2018 | Takakura et al. | |
| 2008/0041137 A1 | 2/2008 | Tipler et al. | |
| 2014/0260540 A1 | 9/2014 | O'Neil et al. | |
| 2017/0023534 A1* | 1/2017 | McCauley | G01N 30/18 |

* cited by examiner

*Primary Examiner* — Robert R Raevis
(74) *Attorney, Agent, or Firm* — David A. Schell

(57) ABSTRACT

A device for a gas chromatograph (GC) system includes an injector connected to an inlet gas line and a conduit assembly. The inlet gas line is configured to pressurize an input end of a column and to deliver a split or purge flow. The conduit assembly includes a conduit surrounding the input end of the analytical column and coupled to a carrier gas line and a controller. The inlet gas line and the carrier gas line connect to a common gas source. The controller, connected to the conduit, has a first mode delivering a flow of carrier gas which is less than the column flow during an injection period to effect a sample transfer to the column and a second mode delivering a flow of carrier gas greater than the column flow following an injection period to prevent the split or purge flow from entering the column.

20 Claims, 10 Drawing Sheets

CARRIER GAS REDUCTION FOR GAS CHROMATOGRAPHY

FIELD

The present disclosure generally relates to the field of gas chromatography including systems and methods for carrier gas reduction for gas chromatography.

INTRODUCTION

Traditional split/splitless (SSL) or programmed temperature vaporizing (PTV) injection ports for gas chromatographs typically consume large volumes of carrier gas by virtue of what is used at the split vent and septum purge vent rather than what is utilized for the actual analytical separation (column flow). For example, a capillary column flow of approximately 1 standard cubic centimeter per minute (sccm) may have 50 sccm or more of split flow and 5 sccm of septum purge flow. One prior art method to reduce this consumption, e.g. "gas saver", can reduce the split flow following an injection period. Reducing the split flow to too low a value however can result in undesirable elevated baselines. This may be caused by a continual outgassing of higher molecular weight contaminants introduced from the sample matrix, outgassing of polymeric seals such as O-rings, injection port septa and/or coring of such septa, or be caused by oxidation of the column stationary phase due to larger concentrations of oxygen which has back-diffused through the septum. Reducing these contaminants has traditionally been accomplished through dilution by using large split flows.

Helium is becoming increasingly expensive and difficult to procure in some areas of the world. Helium is often the preferred carrier gas due to sensitivity, efficiency, chemical inertness, safety or other concerns. The consumption of high purity helium for split/purge flow can be a significant portion of the overall consumption of carrier gas. Additionally, the purity of the carrier gas flowing into the analytical column can be critical to data quality. As such, minimizing the number of gas connections, valves, switches, and the like that can be potential sources of outgas sing of contaminants along the flow path of the high purity carrier gas is desirable.

From the foregoing it will be appreciated that a need exists for improved systems and methods for conserving carrier gas.

SUMMARY

In a first aspect, a device for a gas chromatograph (GC) system can include an injector connected to an inlet gas line and a conduit assembly. The inlet gas line can be configured to pressurize an input end of an analytical column and to deliver at least one of a split or purge flow. The conduit assembly can include a conduit surrounding the input end of the analytical column and coupled to a carrier gas line and a controller. The inlet gas line and the carrier gas line can be configured to connect to a common gas source. The controller can be connected to the conduit and can have a first mode delivering a flow of carrier gas which is less than the column flow during an injection period to effect a sample transfer to the column and a second mode delivering a flow of carrier gas greater than the column flow following an injection period to prevent the split or purge flow from entering the analytical column.

In various embodiments of the first aspect, the controller can include a valve and calibrated restrictors for delivering two levels of carrier gas flow to the conduit, and a T-connector can interpose the injector and an analytical column, having a midpoint that connects to the conduit.

In various embodiments of the first aspect, the injector can be a split/splitless (SSL) injector.

In various embodiments of the first aspect, the injector can be a programmed temperature vaporization injector (PTV).

In particular embodiments, a heated precolumn can interpose the output of the programmable temperature vaporizing injector and the T connector.

In various embodiments of the first aspect, the common gas source can provide He or $H_2$.

In various embodiments of the first aspect, the inlet gas line can provide a flow of not greater than about 10 sccm following the injection period.

In various embodiments of the first aspect, a gas chromatograph system can include an analytical column; a detector coupled to an output end of the analytical column; and the device of the first aspect. In particular embodiments, the gas chromatograph detector can be a mass spectrometer.

In a second aspect, a method for supplying a carrier gas to a gas chromatograph can include providing a carrier gas flow and inlet gas flow to an injector from a common gas source, the inlet gas flow providing a split or purge flow; changing the carrier gas flow to a first flow rate which is less than the column flow during an injection period to effect a sample transfer to the column during an inject phase; changing the carrier gas flow to a second flow rate which is greater than the column flow during an resolving phase to prevent the split or purge flow from entering the analytical column; resolving at least two compounds of the sample with the analytical column; and detecting the at least two compounds exiting the analytical column.

In various embodiments of the second aspect, the detector can be a mass spectrometer.

In various embodiments of the second aspect, the common gas source can provide He or $H_2$.

In various embodiments of the second aspect, the inlet gas flow during the resolving phase can be not greater than about 10 sccm.

In a third aspect, a device for a gas chromatograph system can include an injector coupled to an inlet gas line, a conduit assembly, and a pressure controller. The inlet gas line can be configured to pressurize an input end of an analytical column and to deliver at least one of a split or purge flow. The conduit assembly can include a conduit surrounding the input end of an analytical column and coupled to a carrier gas line and a flow restrictor through which a carrier gas is supplied to the injector from the carrier gas line at a constant pressure. The inlet gas line and the carrier gas line can be configured to connect to a common gas source. The pressure controller can be configured to control the pressure of the gas supplied to the injector through the inlet gas line. The pressure controller can be configured to operate in a first mode to provide a first gas pressure sufficient to force a flow of the gas and a sample onto the analytical column during an inject phase and to operate in a second mode to provide a second gas pressure below a threshold necessary to flow gas from the inlet gas line into the analytical column during a resolving phase.

In various embodiments of the third aspect, the common gas source can provide He or $H_2$.

In various embodiments of the third aspect, the second gas pressure can provide a flow of not greater than about 10 sccm.

In various embodiments of the third aspect, the flow restrictor can be sized to provide a volume of carrier gas sufficient to prevent the split or purge flow from the entering the analytical column when the pressure control is operating in the second mode.

In various embodiments of the third aspect, the flow restrictor can be sized to provide a volume of carrier gas that exceeds the operating flow of the analytical column by a factor of at least about 1.5.

In various embodiments of the third aspect, the flow restrictor can be sized to provide a volume of carrier gas that exceeds the operating flow of the analytical column by a factor of not more than about 10.

In various embodiments of the third aspect, the flow restrictor can be sized to provide a volume of carrier gas between about 1.0 sccm and about 10 sccm.

In various embodiments of the third aspect, the injector can be a split/splitless (SSL) injector.

In various embodiments of the third aspect, the injector can be a programmed temperature vaporization (PTV) injector.

In various embodiments of the third aspect, a gas chromatograph system can include an analytical column, a detector coupled to an output end of the analytical column, and the device of third aspect. In particular embodiments, the gas chromatograph detector is a mass spectrometer.

In a fourth aspect, a method for supplying a carrier gas to a gas chromatograph can include providing a carrier gas flow and an inlet gas flow to an injector, the carrier gas flow being at a substantially fixed pressure and passing through a flow restrictor, the carrier gas flow and the inlet gas flow provided by a common gas source; changing an inlet gas pressure during an inject phase to a first pressure sufficient to force at least a portion of the inlet gas flow and at least a portion of a sample onto an analytical column; changing the inlet gas pressure during a resolving phase to an operating pressure of the analytical column; resolving at least two compounds of the sample with the analytical column; and detecting the at least two compounds exiting the analytical column.

In various embodiments of the fourth aspect, the inlet gas flow during the resolving phase can be not greater than about 10 sccm.

In various embodiments of the fourth aspect, the detector can be a mass spectrometer.

In various embodiments of the fourth aspect, the common gas source can provide He or $H_2$.

In various embodiments of the fourth aspect, the flow restrictor can be sized to provide a volume of carrier gas sufficient to prevent the inlet gas flow from entering the analytical column during the resolving phase.

In various embodiments of the fourth aspect, the flow restrictor can be sized to provide a volume of carrier gas that exceeds the operating flow of the analytical column by a factor of at least about 1.5.

In various embodiments of the fourth aspect, the flow restrictor can be sized to provide a volume of carrier gas that exceeds the operating flow of the analytical column by a factor of not more than about 10.

In various embodiments of the fourth aspect, the flow restrictor can provide a volume of carrier gas between about 1.0 sccm and about 10 sccm.

DRAWINGS

For a more complete understanding of the principles disclosed herein, and the advantages thereof, reference is now made to the following descriptions taken in conjunction with the accompanying drawings, in which.

Figure 1:
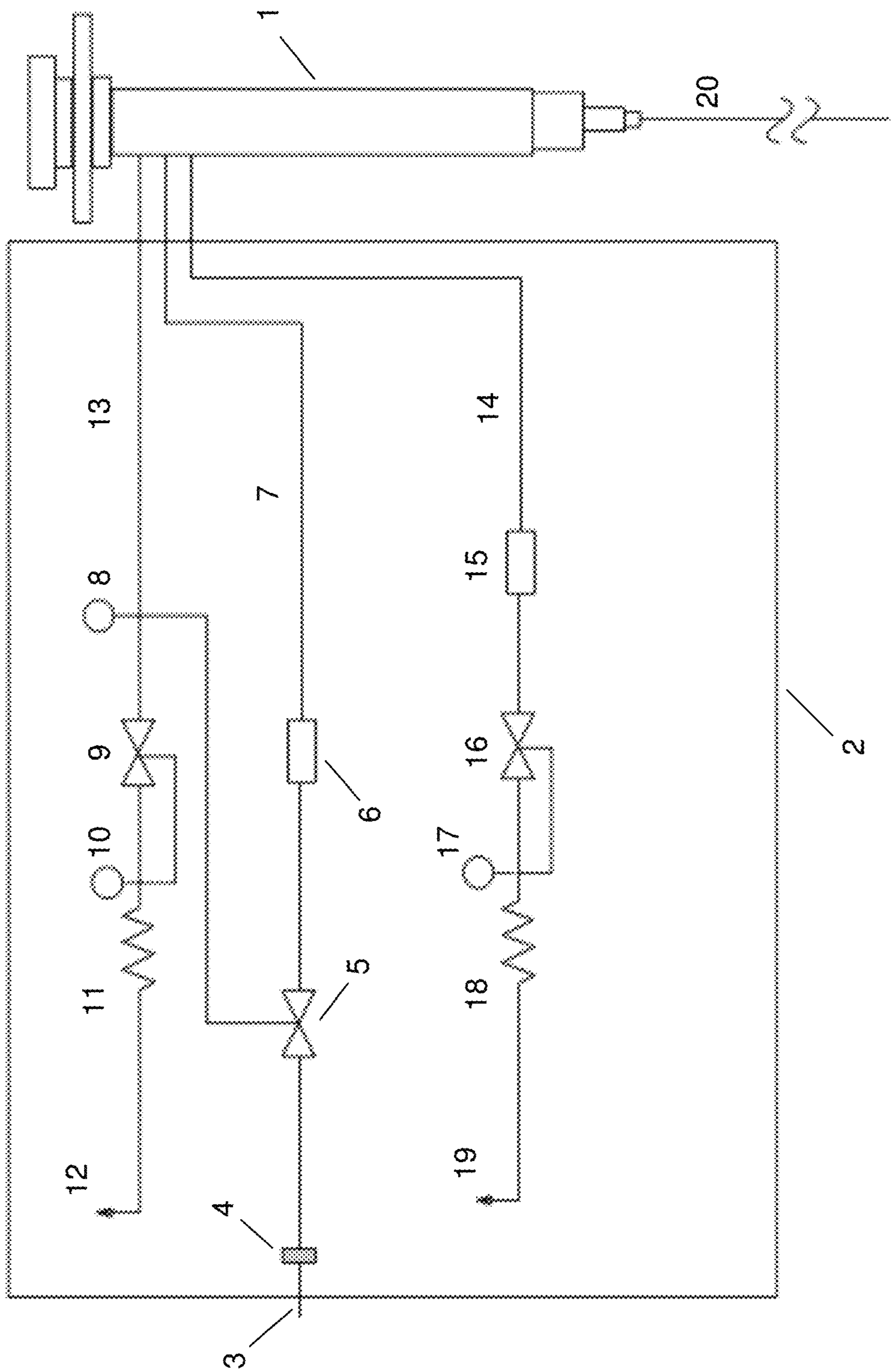
FIG. 1 is a diagram of an exemplary split/splitless injection system for a gas chromatograph.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for conserving carrier gas are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

One method used to conserve helium carrier gas, is to substitute nitrogen or other inert gas for the high consumption septum purge and split flows, while maintaining helium for the column flow. This is described in U.S. Pat. No. 8,371,152. Although this methodology results in outstanding helium conservation, it requires using an auxiliary non-helium gas as well as the associated high-pressure cylinder, gas scrubber, regulator and plumbing, resulting in increased user maintenance and initial hardware cost.

In various embodiments, a flow of carrier gas can be supplied to an analytical column separate from an inlet gas used to provide a split/purge flow through the injector. The carrier gas can partially backflow into the inlet to prevent contaminants from the inlet from entering the analytical column and contributing to elevated baselines. Since the carrier backflow gas prevents column contamination, the inlet gas flow can be significantly reduced both during operation and in standby. Advantageously, this can significantly reduce the consumption of high purity carrier gas even while utilizing the same high purity carrier gas to supply both the inlet gas flow and the carrier gas flow. This can eliminate the need for an auxiliary gas, an auxiliary non-helium gas as well as the associated high-pressure cylinder, gas scrubber, regulator and plumbing.

In various embodiments, the analytical column flow can be regulated by the pressure of the inlet gas within the injector. By providing a restricted flow of the backflow gas that is slightly greater than the analytical column flow, the inlet gas flow can be substantially excluded from the analytical column during separation. During injection, a pressure surge of the inlet gas flow within the injector or a drop in the backflow gas flow can be used to load the sample into the analytical column.

FIG. 1 illustrates a typical gas chromatograph inlet system. The system includes a split/splitless (SSL) injector 1 for injecting liquid samples. A carrier gas is delivered via an electronic pressure controller 2 to the injector 1. A gas supply, e.g. helium, is introduced under pressure to a gas fitting 3. A fine porosity filter 4, e.g. a stainless steel frit, removes any particulate matter that may foul operation of the proportional valve 5. The proportional valve 5 maintains a setpoint pressure within the body of the injector to establish a calculated flow in the analytical column 20. The proportional valve 5 can be controlled by sensing the pressure of the injector using a pressure sensor that provides a feedback loop to the control circuit (not shown). Optionally, a chemical trap 6 is included to scrub the carrier gas of potential contaminants, e.g. hydrocarbons and/or oxygen. Additional proportional valves 9, 16 allow purging and venting of some of the delivered carrier gas from the septum purge vent 12 and split vent 19 respectively, by calculation of the pressure drop across restrictors 11, 18.

In the split injection mode, a split flow is established that exits the split line 14. This mode is used for injection of concentrated analytes to prevent overloading of the column or saturation of the detection system used at the terminal end of the column.

In the splitless mode of operation, the split line 14 is closed during injection to cause the bulk of the sample material to be transferred to the capillary column 20. After a specified time interval, the split vent is opened to vent residual solvent vapors and to dilute any contaminants that might outgas from contaminated surfaces.

In both modes, far greater amounts of carrier gas are used for split flow and septum purge flow than are required for the gas chromatography (GC) column flow carrying out the analytical separation. Following a split or splitless injection, large volumes of split flow are typically maintained to dilute outgassing of residual contaminants. This results in a large consumption of high purity carrier gas, such as helium.

Figure 2:
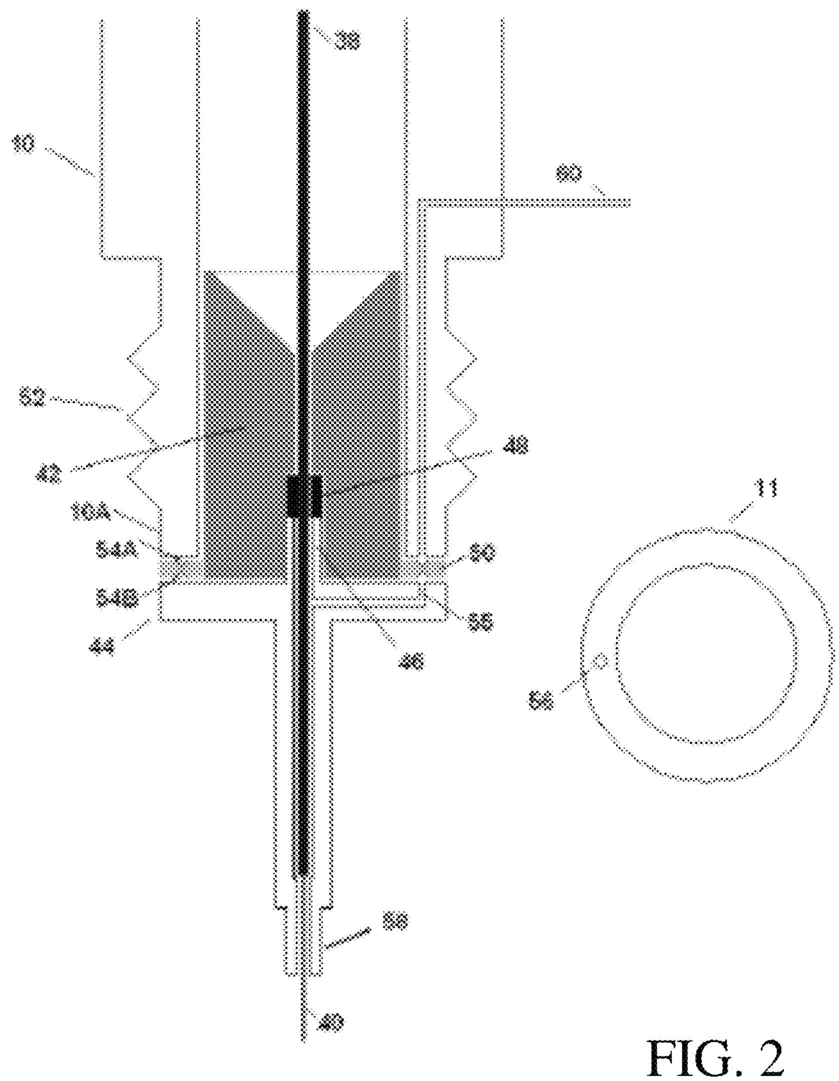
FIG. 2 is a diagram of an exemplary split/splitless injection system for a gas chromatography instrument, in accordance with various embodiments.

FIG. 2 illustrates an embodiment of a carrier gas conservation device for use with a modified SSL injector. The lower portion of an SSL injector is designed to allow a carrier gas to be selectively passed over the end of an analytical column. A separate flow of this gas is introduced to the injector in a conventional manner in order to pressurize the inlet and provide split flow and septum purge flow. The novel SSL injector body may be used in the system disclosed in FIG. 1.

The upper end of a conduit 38, e.g. short segment of deactivated fused silica tubing, serves as a back-diffusion barrier to the inlet gas and is positioned within the confines of an injection port liner (not shown). Positioned within the tubing 38 is the analytical column 40. A liner support 42 and base 44 are screwed together at the threaded stem 46 to allow compression of the encapsulated graphite ferrule 48. This maintains a gas tight seal between the fused silica tubing 38 and the base 44. A soft metallic gasket 50 is positioned between the base 44 and terminal end of the injector 10A to create a seal between base 44 and the injector body 10. A retaining nut (not shown) secures the base 44 to the threaded portion 52 of injector body 10.

The short segment of fused silica tubing 38 is selected to have an internal diameter slightly larger than the outer diameter of the analytical column 40. For example, Megabore tubing of 0.53 mm ID is suitable for most analytical columns with internal diameters of 0.25 or 0.32 mm ID. Preferably the tubing has been deactivated and contains no stationary phase. This segment of tubing alternatively can be fabricated from glass lined stainless steel tubing, Silcosteel® tubing, or other suitably inert material.

In this illustrative example, the analytical column 40 extends preferably to within 1 cm of the uppermost end of the tubing 38. This allows locating the column entrance within the hot injector body, minimizes void volume effects and allows a sufficient back diffusion barrier to the gas within the injection port. The gasket 50 includes a pair of gas channels 54A, 54B in the form of an annular groove cut on each face of the metallic gasket 50. The gasket 50 shown in top view as 11 also includes a hole 56 located on the centerline of gasket 50 to create a fluid communication between the upper and lower groove channels 54A, 54B. The terminal end 58 of base 44 is threaded so that a retaining nut and ferrule (not shown for simplicity) can create a seal between the analytical column 40 and the base 44. A conduit 60 supplies a flow of carrier gas to the upper groove channel 54A. The carrier flows around the upper groove channel until it finds hole 56. It then passes through hole 56 into the lower groove channel 54B and into base 44 at entrance point 55. The base 44 allows the carrier gas to flow downward around the outside of the fused silica tube 38 to sweep void volume then proceed upward into tube 38 and finally the injector interior after passing the input end of the analytical column 40. The flow established into the conduit 60 should be slightly higher than the calculated column flow delivered to column 40 following the injection period. To illustrate, 5 sccm of conduit flow could be used for calculated column flows of 1 sccm.

The flow through a GC capillary column is typically established by setting an inlet pressure. The flow can be calculated and thereby controlled using prior knowledge of the gas viscosity, column dimensions and inlet and outlet pressures using the Poiseuille equation:

$$\frac{dV}{dT} = \frac{\pi r^4}{16\eta L}\left(\frac{(p_i^2 - p_o^2)}{p_o}\right) \quad \text{Equation 1}$$

where:

$P_i$ inlet pressure $P_o$ outlet pressure

L is the length of the column

η is the viscosity of the gas r is the column internal radius

Since the inlet pressure is known, the conduit 60 can be connected to a restricted flow of carrier gas so that a flow of carrier across the input end of the analytical column can be provided. The flow of carrier to the column is maintained by the head pressure of the inlet gas in the injector, while the excess carrier gas delivered through conduit 60 is simply diverted upward into the injector where it contributes to the bulk gas purge. The inert nature of the deactivated fused silica tube 38 along with its short length ensure minimal surface activity and efficient sample transfer.

The embodiment of FIG. 2 uses hardware that may be removed from the system for maintenance and column positioning purposes while also allowing re-assembly which is immune to rotational positioning of the components. This provides significant ease-of-use.

The flow of carrier to the conduit 60 can be established by any means known in the current art including but not limited to programmable pressure and/or flow controllers, manual pneumatic controllers and regulators, secondary inlet pressure controllers e.g. (from a secondary GC inlet pneumatic module pressurizing a calibrated restrictor).

The flow delivered by the conduit 60 can be calculated using a mathematical model or optimized empirically by adjusting the flow while monitoring the ability of the back-flow gas to occlude injected analytes from column 40.

Injection by Coaxial Flow Reduction

In various embodiments, injection of the sample into the column can be accomplished by reducing the coaxial flow. During injection of a sample, the flow of carrier gas into conduit 60 of FIG. 2 can be interrupted such that the delivered carrier flow is reduced below the column flow. The carrier gas introduced to injector body 10 from the electronic pressure controller will then sweep sample components onto the analytical column 40. The flow into conduit 60 is preferably reduced to a fraction of the column flow (rather than completely stopped) to a low value e.g. 0.05 sccm to help sweep void volumes, reduce peak tailing and prevent back diffusion of solvent vapors into the gas lines. Following the injection of the sample and sample transfer to the analytical column 40, the helium flow in conduit 60 is re-established so that the chromatographic process utilizes helium delivered from conduit 60 for the bulk of the analytical separation, while the carrier gas delivered to the body of the inlet 10 from the electronic pressure controller is used to purge the injector. For splitless injections, a purge of flow of tens of milliliters per minute such as 50 milliliters per minute may be used to quickly remove residual solvent vapors from the inlet after sample transfer, followed by a reduction to very low split flows such as zero milliliters per minute split flow. Alternatively, since solvent vapors are occluded from column entry following sample transfer, the split flow may be reduced to a low constant value such as five milliliters per minute. This will allow slow removal of solvent vapors during run time while also allowing for outgassing of higher molecular weight matrix residuals without transfer to the column.

Figure 3:
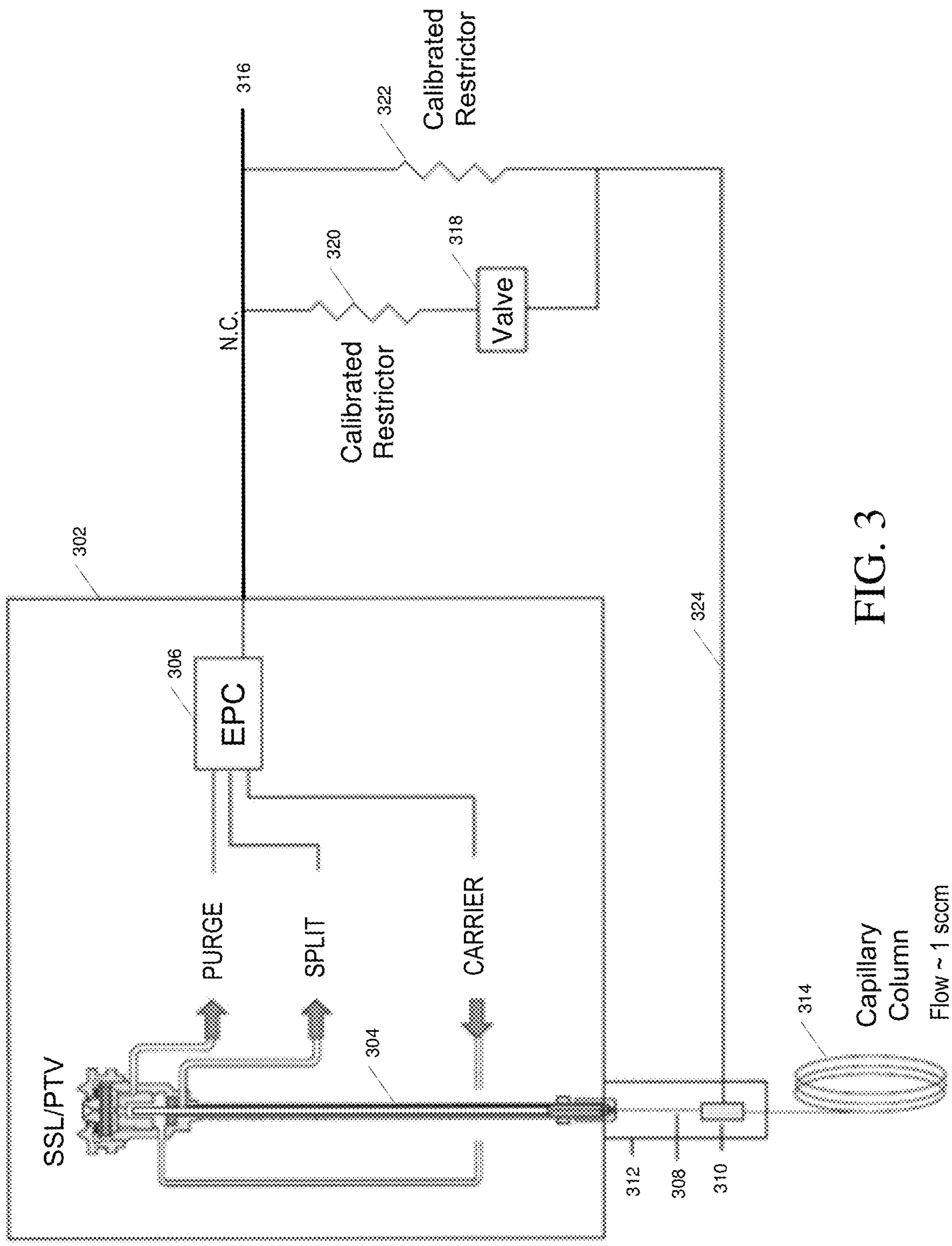
FIGS. 3 and 5 are diagrams of the gas flow for exemplary split/splitless injection systems for a gas chromatography instrument, in accordance with various embodiments.

FIG. 3 illustrates an embodiment illustrating how it can be used on existing in-field chromatographs. An inlet system 302 comprising a PTV or SSL injector 304 and electronic flow controller 306 can be outfitted with a short segment of pre-column 308 and low-dead-volume tee piece 310 housed in a small heated zone 312. The temperature control of heated zone 312 can be provided by an external controller or by an unused auxiliary heater channel as is often found on typical GC systems. The pre-column 308 can be as short as possible and comprises a few centimeters length of 0.53 mm ID fused silica tubing, steel clad fused silica tubing, glass lined stainless steel tubing etc. The inlet of analytical column 314 can pass through tee-piece 310 and terminate within the heated pre-column 308 preferably within one centimeter of the uppermost end. A carrier gas source can be delivered at feed point 316. A valve 318, of the on/off type can receive a carrier gas flow from feed point 316 via a capillary restrictor 320 set to a flow that is above the analytical column flow such as 2 sccm. The dimensions of the restrictors can be selected based on the input pressure of feed point 316 to establish a given flow range based on the pressure swing of injector 304. The actual flow can vary, e.g. 2-4 sccm without affecting performance. A capillary restrictor 322 can be disposed in the flow path of conduit 324 for delivering a low purge flow for compensation of void volume effects. The flow delivered by the capillary restrictor 322 can be lower than the analytical column flow and can be for purposes of illustration, 0.05 sccm. The solenoid valve 318 can be actuated to deliver 2 sccm flow to the tee piece 310 during periods of run time or switched off during periods of injection, during cool down of the GC oven, or any non-run time period. Activation of solenoid valve 318 can be accomplished using the time events programming features of most modern-day gas chromatographs.

Figure 4:
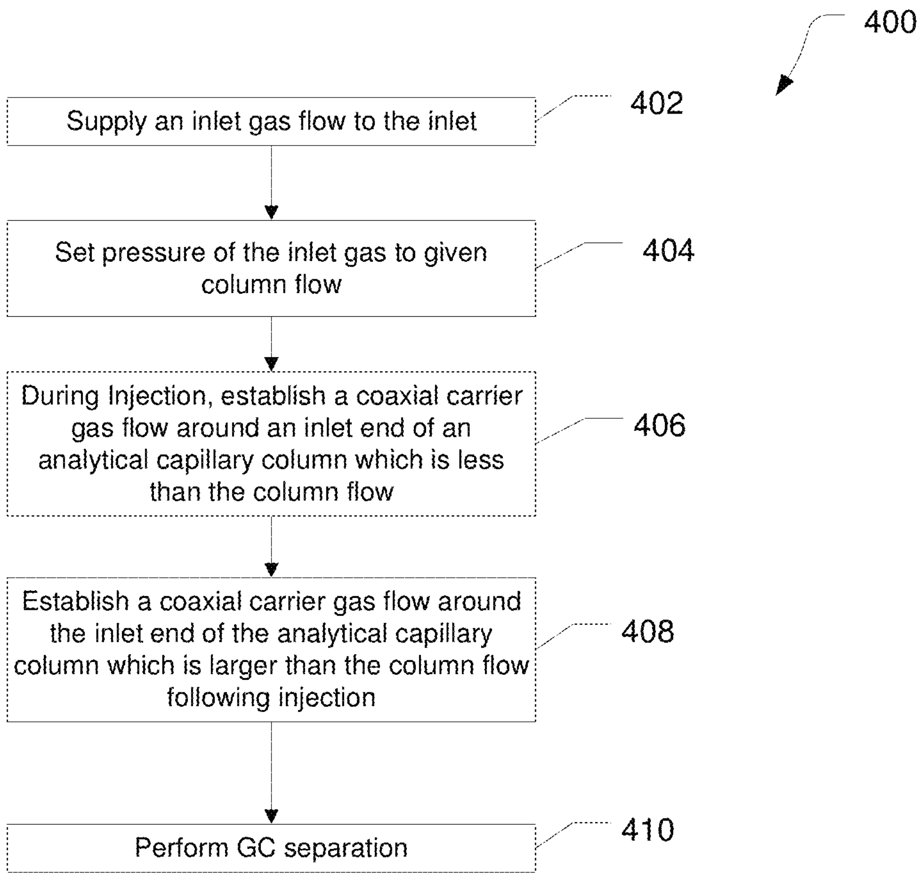
FIGS. 4 and 6 are flow diagrams of an exemplary method for operating a gas chromatography instrument, in accordance with various embodiments.

FIG. 4 shows a carrier gas conservation flowchart for the operation of a gas chromatograph using the coaxial flow reduction technique. In step 402, the inlet can be supplied with a carrier gas such as helium gas or hydrogen gas. In step 404, the pressure of the inlet gas can be set to correspond to a given column flow. In step 406, during an injection period, a coaxial helium flow around the inlet end of an analytical capillary column can be established. This flow can be less than the column flow. In step 408, after the injection period, a coaxial helium flow can be established around the inlet end of an analytical column. The flow can be larger than the column flow. After the injection period and during analysis, the gas flow to the inlet can be reduced to not greater than about 10 sccm, such as not greater than about 5 sccm while still providing sufficient purge and/or split flow as the coaxial helium flow can substantially prevent outgassing of matrix residuals from entering the analytical column. In step 410, GC separation can be performed.

Injection by Inlet Pressure Increase

In various embodiments, the flow delivered by conduit 60 of FIG. 2 can be substantially constant, eliminating the need for valve 318 of FIG. 3. During injection of a sample into the injector, the injector pressure can be increased to force the backflow of carrier onto the column during injection. The inlet gas will then sweep sample components onto the analytical column. Following the injection of the sample and sample transfer to the analytical column, the injector pressure is controllably decreased to re-establish the backflow of carrier gas sufficient to limit inlet gas from entering the analytical column so that the chromatographic process utilizes contaminant free carrier gas for the bulk of the analytical separation, while the inlet gas is used to purge the injector.

Figure 5:
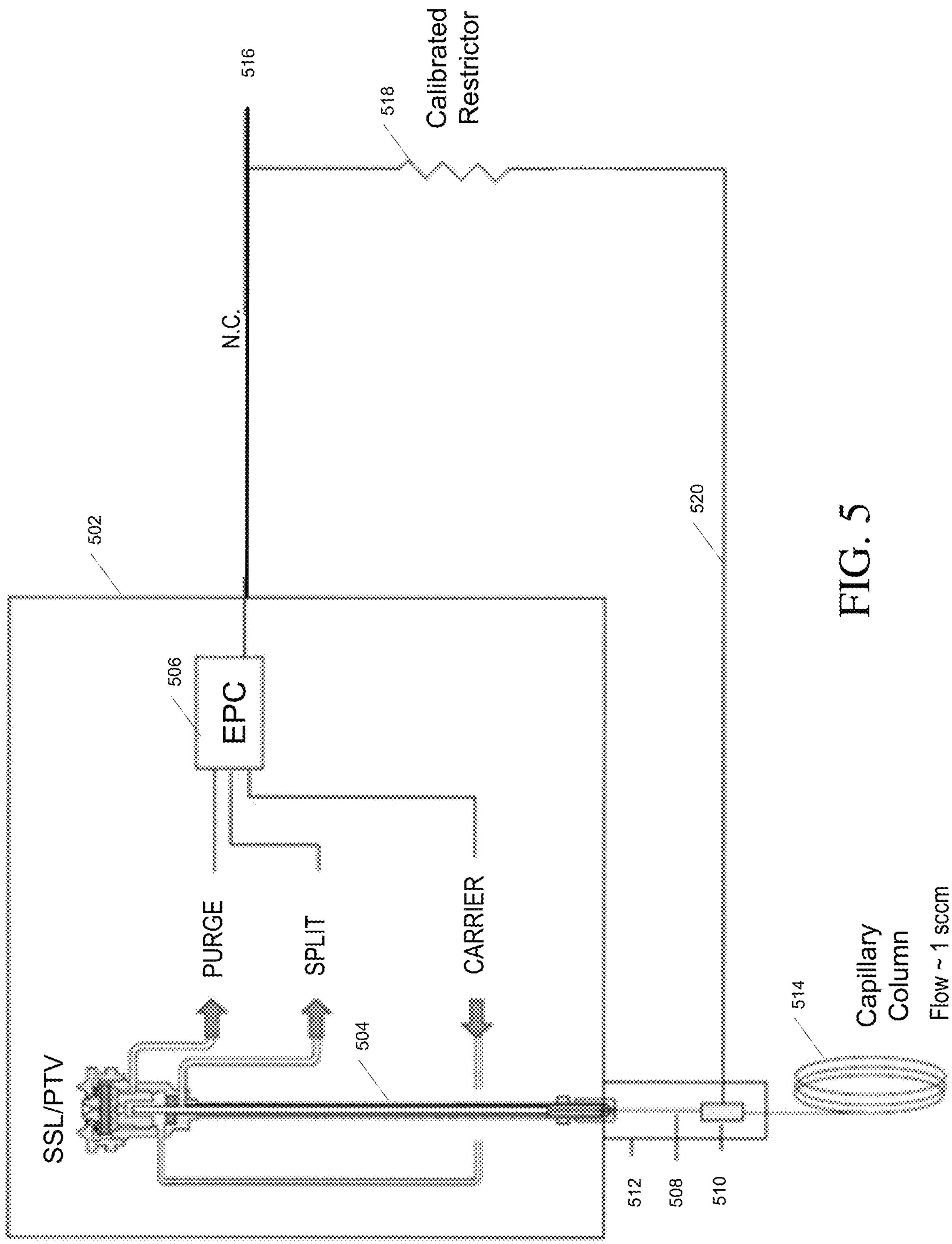

FIG. 5 illustrates an embodiment of a carrier gas conservation device for use with an unmodified PTV or SSL injector, such as on an existing gas chromatograph in the injection by pressure increase mode. An inlet system 502 comprising a PTV or SSL injector 504 and electronic flow controller 506 is outfitted with a short segment of pre-column 508 and low-dead-volume tee piece 510 housed in a small heated zone 512. The temperature control of heated zone 512 can be provided by an external controller or by an unused auxiliary heater channel as is often found on typical GC systems. The pre-column 508 is preferably as short as possible and comprises a few centimeters length of 0.53 mm ID fused silica tubing, steel clad fused silica tubing, glass lined stainless steel tubing, or the like. The inlet of analytical column 514 should pass through tee-piece 510 and terminate within the heated pre-column 508 preferably within one centimeter of the uppermost end. A carrier gas source, such as helium is delivered at feed point 516. A capillary restrictor 518 is disposed in the flow path of conduit 520 for delivering a carrier gas flow that is greater than the analytical column flow, such as about 2.0 sccm. The dimensions of the restrictor can be selected based on the input pressure of feed point 516 to establish a given flow range based on the pressure swing of injector 504. The actual flow can vary, e.g. 2-4 sccm without affecting performance.

Figure 6:
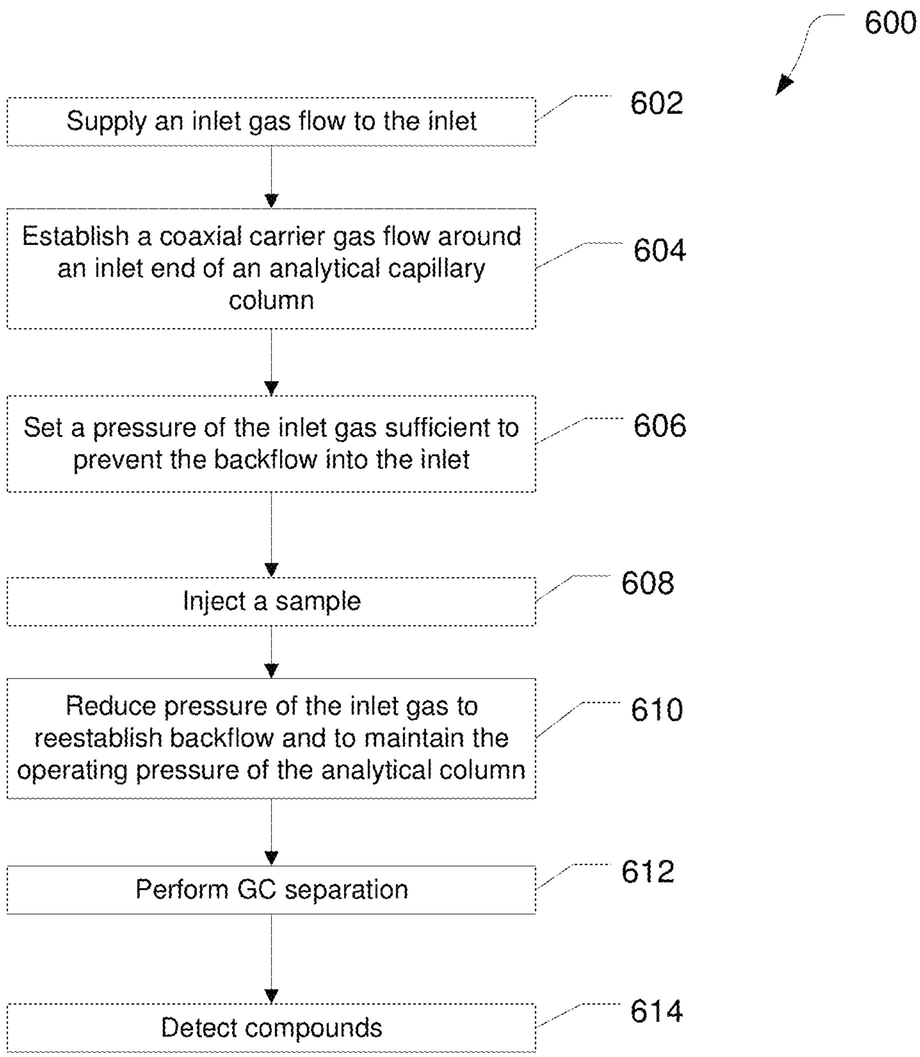

FIG. 6 shows a flow diagram for the operation of the gas chromatograph using a carrier gas conservation device using the injection by pressure increase technique. At 602, the inlet can be supplied with an inlet gas flow.

At 604, a coaxial flow of gas can be established near the inlet to the column which is greater than the column flow. The inlet gas and the carrier gas can have the same composition and can be optimally supplied by the same gas source. In various embodiments, the gas source can be helium (He) or hydrogen ($H_2$). The coaxial carrier gas flow can be established by providing a pressurized flow of the carrier gas through a flow restrictor. The flow of the carrier gas through the restrictor can be larger than the column flow, such as by an amount sufficient to prevent the outgassed high-molecular weight contaminants and oxygen diffused through the septa from entering the analytical column during a separation or resolving period of the column operation. For example, the flow of the carrier gas can exceed the operational flow of the analytical column during separation by a factor of at least about 1.5, such as a factor of at least about 2, even a factor of at least about 4. In various embodiments, the flow through the restrictor may exceed the operational flow of the analytical column by a factor of not more than about 10, such as a factor of not more than about 5. In various embodiments, the flow restrictor can provide a volume of carrier gas between about 1 sccm and about 10 sccm, such as between about 2 sccm and about 5 sccm.

At 606, the pressure of the inlet gas can be increased and, at 608, a sample can be injected. The pressure increase can be sufficient to prevent the coaxial backflow of gas into the inlet, thereby allowing injected analytes to be carried onto the column.

In various embodiments, the sample can be heated to vaporize the components. For a splitless injection, substantially all of the sample can enter the column during the injection period. Alternatively, for a split injection, only a portion of the sample can enter the column during the injection period, while the rest of the sample is flushed from the injector with the split gas flow.

At 610, after the injection period, the pressure of the inlet gas can be lowered to a pressure sufficient to maintain an operating flow of gas through the analytical column and to re-establish the backflow. After the injection period, the gas flow to the inlet can be reduced to not greater than about 10 sccm, such as not greater than about 5 sccm while still providing sufficient purge and/or split flow. While the inlet gas regulates the pressure of the analytical column, the flow of the carrier gas is sufficient that the gas flowing through the column consists of the carrier gas and is substantially free of the inlet gas and contaminants from the injector.

At 612, components of the sample can be separated by the analytical column, and at 614, the components exiting the column can be detected and/or analyzed. In various embodiments, the components can be detected by various means, such as a flame ionization detector, a thermal conductivity detector, a mass spectrometer, or the like.

Results

Figure 7:
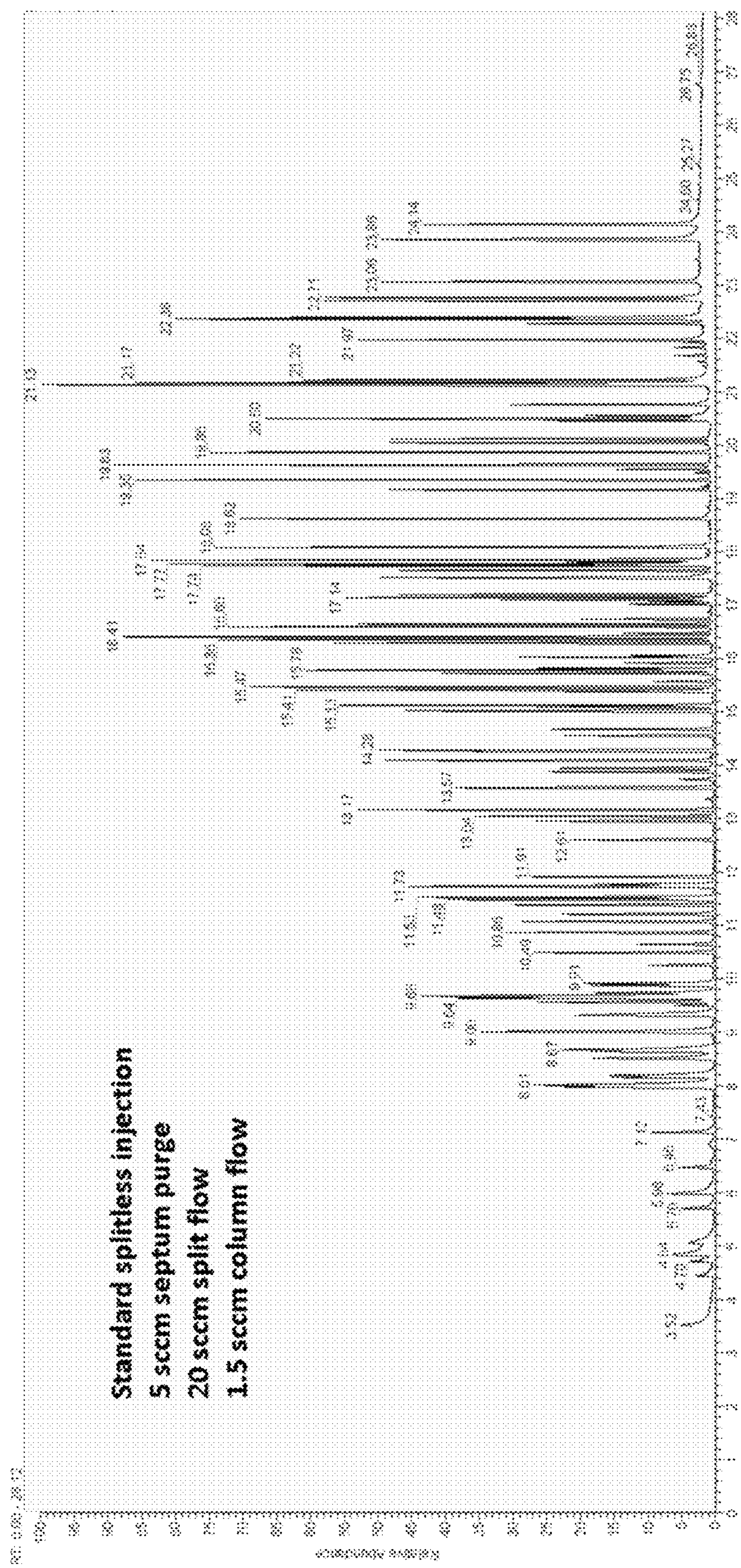
FIG. 7 is a chromatogram of a standard split-splitless injector operating in splitless mode.
Figure 8:
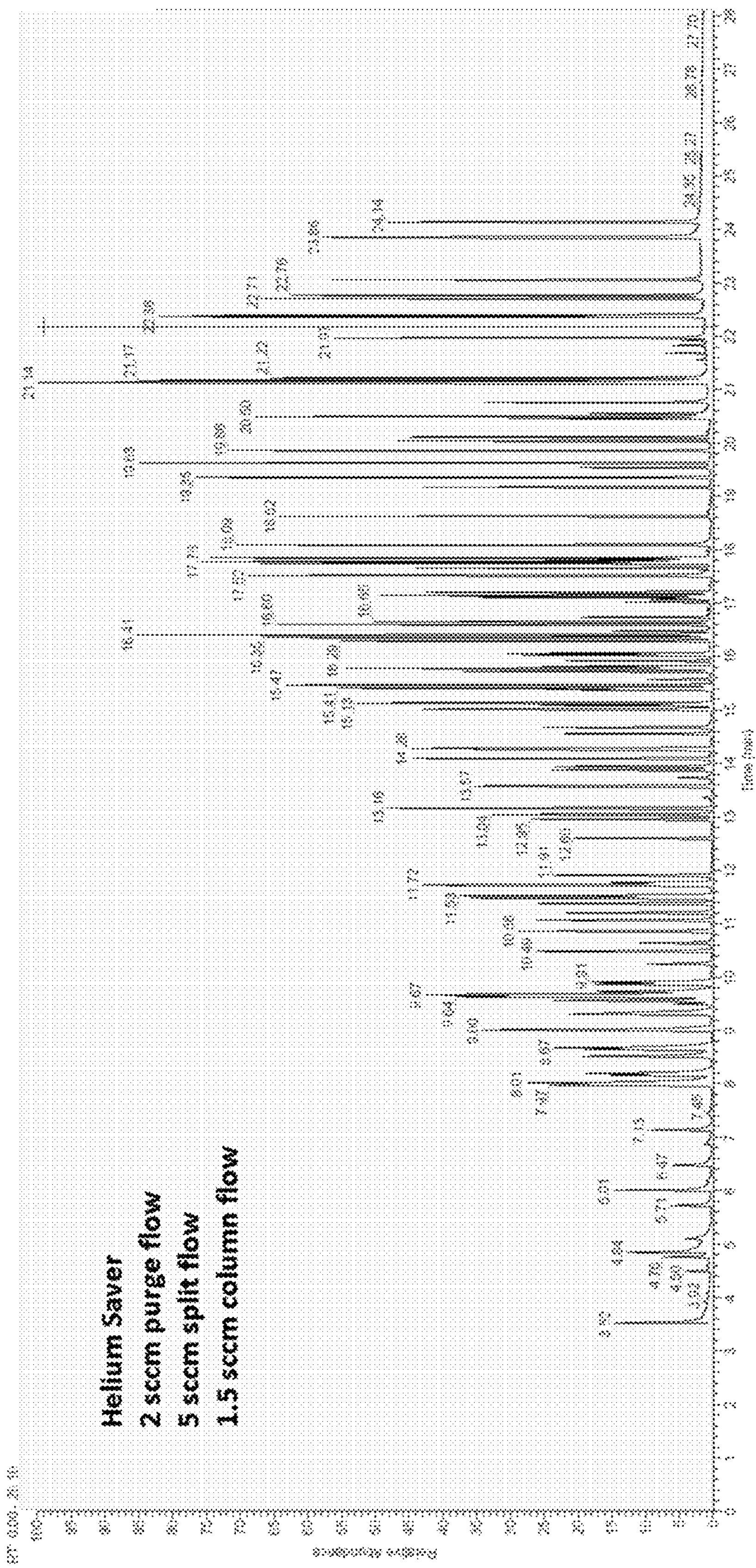
FIGS. 8 through 10 are exemplary data illustrating the use of an exemplary split/splitless injection system, in accordance with various embodiments.

FIG. 8 shows a chromatogram acquired using the coaxial flow reduction technique. By comparison, FIG. 7 shows a chromatogram acquired with a conventional split-splitless injector using the same column and method parameters. As seen, peak shapes and retention times are nearly identical.

Table 1 provides exemplary flow rates during operation of the column for FIGS. 7 and 8. FIG. 8 shows that the purge flow and split flow rates are significantly reduced as the backflow of the carrier gas into the injector prevents contaminants from the injector from entering the column during the analytical phase. In this example, total gas consumption is about 3 times lower than with conventional operation during sample analysis. Lower flows are possible, so long as the electronic pressure control can adequately deliver precise pressures at low flow rates.

TABLE 1

Gas Flow Rates

| | Flow Reduction (FIG. 8) | Conventional (FIG. 7) |
|---|---|---|
| Inlet flow (EPC) | 4.5 sccm | 26.5 sccm |
| Back flow | 2.5 sccm | |
| Column flow | 1.5 sccm | 1.5 sccm |
| Purge | 2 sccm | 5 sccm |
| Split | 5 sccm | 20 sccm |
| Total helium flow | 8.5 sccm | 26.5 sccm |

Figure 9:
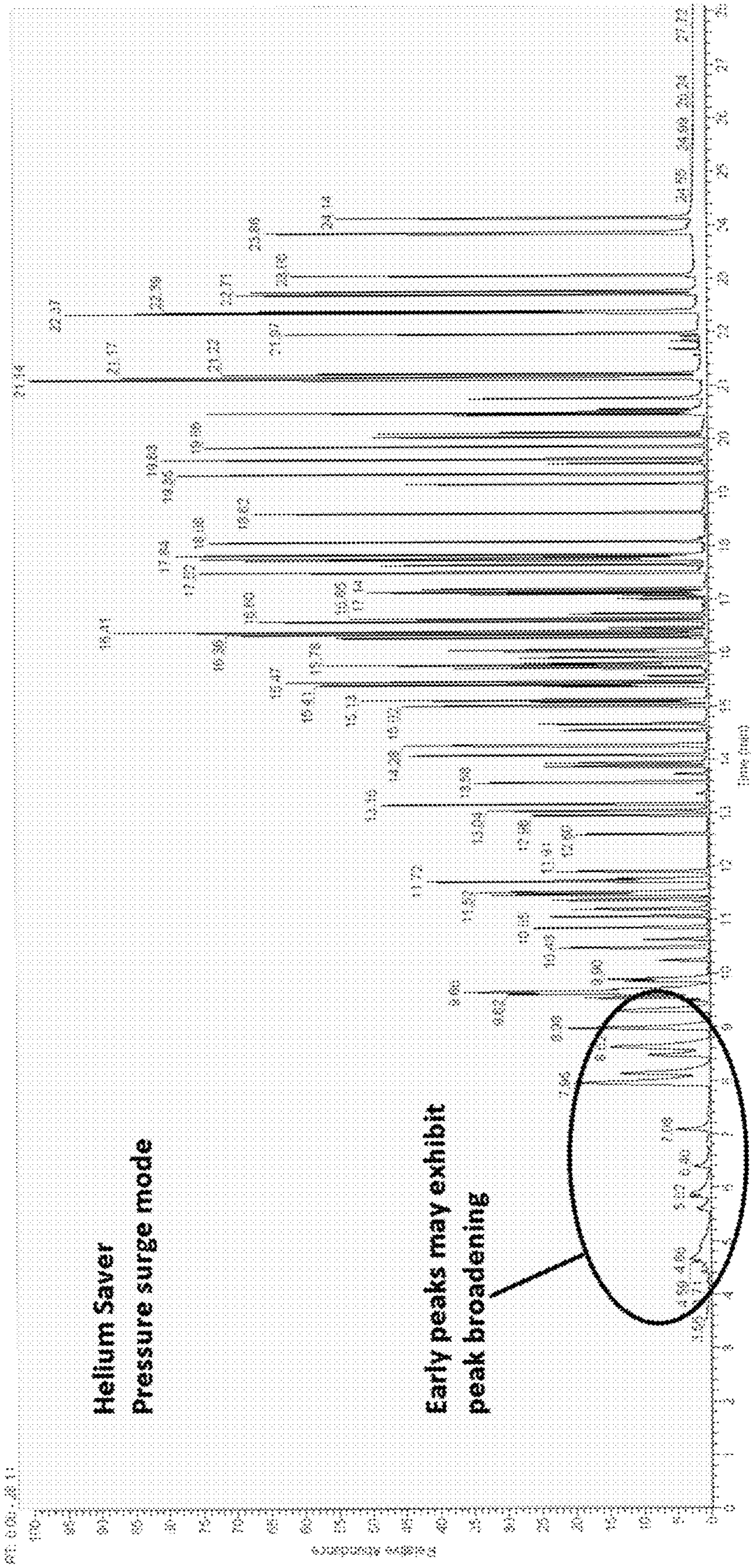

FIG. 9 shows chromatogram from a splitless injection using the injection by inlet pressure increase method. As shown, early eluting peaks may broaden. The broadening effect can be partially mitigated by reducing the backflow gas to a minimum.

Figure 10:
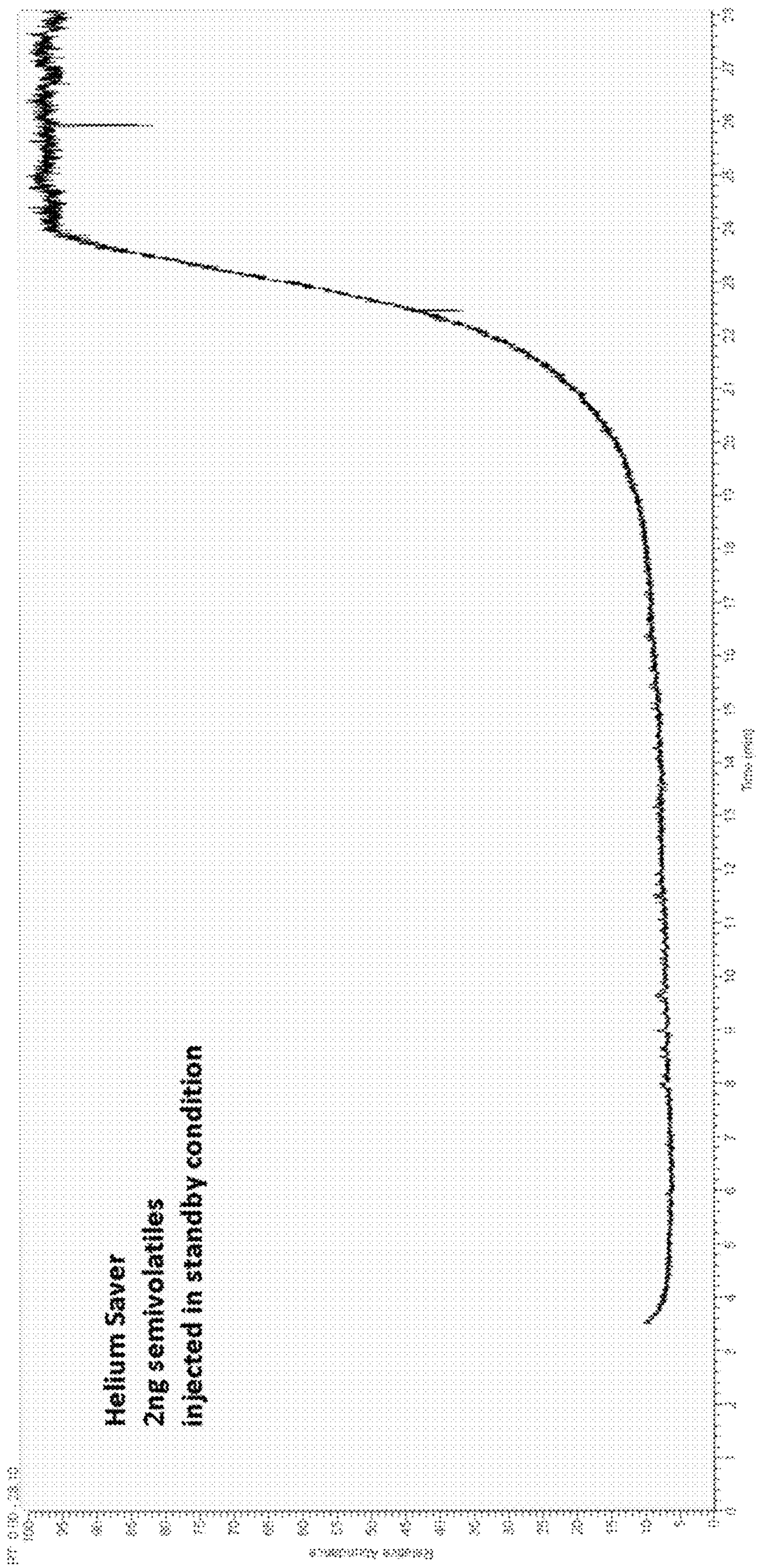

FIG. 10 shows a chromatogram acquired using the same injection of analytes as in FIG. 9, but without a pressure surge. As shown, the backflow of gas in the back-diffusion barrier efficiently excludes injected analytes in the absence of a pressure surge. The back flow of gas can be reduced until injected analytes begin to appear under non-surge conditions. This allows reducing consumption of back flow gas to a minimum.

What is claimed is:

1. A device for a gas chromatograph (GC) system comprising:

an injector connected to an inlet gas line, the inlet gas line configured to pressurize an input end of an analytical column and to deliver at least one of a split or purge flow; and a conduit assembly, including, a conduit surrounding the input end of the analytical column and coupled to a carrier gas line, the inlet gas line and the carrier gas line configured to connect to a common gas source; and a controller, connected to the conduit, having a first mode delivering a flow of carrier gas which is less than the column flow during an injection period to effect a sample transfer to the column and a second mode delivering a flow of carrier gas greater than the column flow following an injection period to prevent the split or purge flow from entering the analytical column.

2. A device as in claim 1, the controller including a valve and calibrated restrictors for delivering two levels of carrier gas flow to the conduit; a T connector interposes an injector and an analytical column, having a midpoint that connects to the conduit.

3. The device of claim 1, wherein the injector is a split/splitless (SSL) injector.

4. The device of claim 1, wherein the injector is a programmed temperature vaporization injector (PTV).

5. The device of claim 4, further comprising a heated precolumn interposing the output of the programmable temperature vaporizing injector and the T connector.

6. The device of claim 1, wherein the common gas source provides He or $H_2$.

7. The device of claim 1, wherein the inlet gas line provides a flow of not greater than about 10 sccm following the injection period.

8. A gas chromatograph system comprising:

an analytical column;

a detector coupled to an output end of the analytical column; and the device of claim 1.

9. The gas chromatograph system of claim 8, wherein the gas chromatograph detector is a mass spectrometer.

10. A method for supplying a carrier gas to a gas chromatograph, comprising:

providing a carrier gas flow and inlet gas flow to an injector from a common gas source, the inlet gas flow providing a split or purge flow;

changing the carrier gas flow to a first flow rate which is less than the column flow during an injection period to effect a sample transfer to the column during an inject phase;

changing the carrier gas flow to a second flow rate which is greater than the column flow during an resolving phase to prevent the split or purge flow from entering the analytical column;

resolving at least two compounds of the sample with the analytical column; and detecting the at least two compounds exiting the analytical column.

11. The method of claim 10, wherein the detector is a mass spectrometer.

12. The method of claim 10, wherein the common gas source provides He or $H_2$.

13. The method of claim 10, wherein the inlet gas flow during the resolving phase is not greater than about 10 sccm.

14. A method for supplying a carrier gas to a gas chromatograph, comprising:

providing a carrier gas flow and an inlet gas flow to an injector, the carrier gas flow being at a substantially fixed pressure and passing through a flow restrictor, the carrier gas flow and the inlet gas flow provided by a common gas source;

changing an inlet gas pressure during an inject phase to a first pressure sufficient to force at least a portion of the inlet gas flow and at least a portion of a sample onto an analytical column;

changing the inlet gas pressure during a resolving phase to an operating pressure of the analytical column;

resolving at least two compounds of the sample with the analytical column; and detecting the at least two compounds exiting the analytical column.

15. The method of claim 14, wherein the inlet gas flow during the resolving phase is not greater than about 10 sccm.

16. The method of claim 14, wherein the detector is a mass spectrometer.

17. The method of claim 14, wherein the flow restrictor is sized to provide a volume of carrier gas sufficient to prevent the inlet gas flow from entering the analytical column during the resolving phase.

18. The method of claim 14, wherein the flow restrictor is sized to provide a volume of carrier gas that exceeds the operating flow of the analytical column by a factor of at least about 1.5.

19. The method of claim 14, wherein the flow restrictor is sized to provide a volume of carrier gas that exceeds the operating flow of the analytical column by a factor of not more than about 10.

20. The method of claim 14, wherein the flow restrictor provides a volume of carrier gas between about 1.0 sccm and about 10 sccm.

* * * * *